No. 772,386. PATENTED OCT. 18, 1904.
W. TISCH & H. T. WATERS.
CIGAR BOX.
APPLICATION FILED JUNE 4, 1904.
NO MODEL.

WITNESSES:
C. H. Walker
A. A. Ege.

INVENTORS
William Tisch
Henry T. Waters
BY
Theodore Dalton, Attorney

No. 772,386.  Patented October 18, 1904.

UNITED STATES PATENT OFFICE.

WILLIAM TISCH AND HENRY T. WATERS, OF LA CROSSE, WISCONSIN.

CIGAR-BOX.

SPECIFICATION forming part of Letters Patent No. 772,386, dated October 18, 1904.

Application filed June 4, 1904. Serial No. 211,160. (No model.)

*To all whom it may concern:*

Be it known that we, WILLIAM TISCH and HENRY T. WATERS, citizens of the United States, residing at La Crosse, in the county of La Crosse and State of Wisconsin, have invented new and useful Improvements in Cigar-Boxes, of which the following is a specification.

This invention relates to improvements in cigar-boxes, and has for its object to provide a strong, durable, light, and inexpensive receptacle of this character which is so constructed as to establish a practically air-proof box in which the cigars are held and maintained in an upright or vertical position.

A further object of the invention resides in the provision of means whereby the cigars may be kept moist or prevented from drying and becoming crisp and brittle.
These objects will be apparent as the nature of the invention is better understood, reference being had to the following description and the accompanying drawings for the details of construction.
Our improved cigar-box is illustrated in the accompanying drawings, in which—

Figure 1:
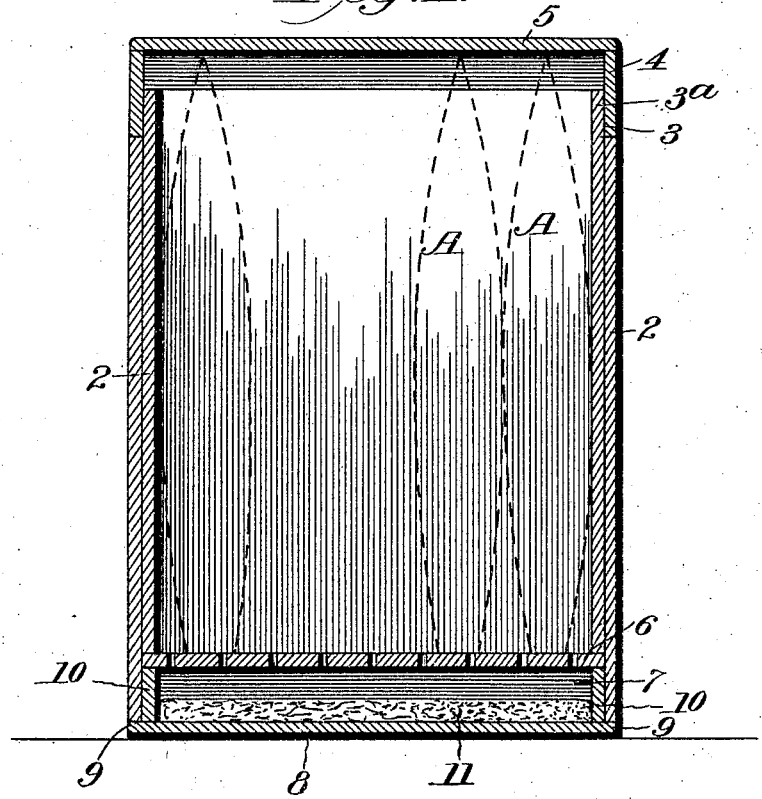
Figure 2:
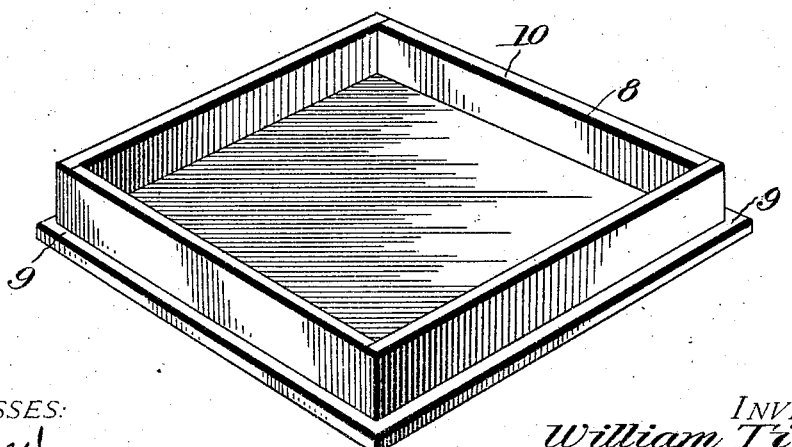

Figure 1 is a central vertical section of the same, and Fig. 2 is a perspective view of the inner side of the moistener-holder.
Making renewed reference to the drawings, wherein similar characters of notation indicate corresponding parts appearing in both illustrations, and reference being had thereto, 1 designates the cigar-box proper, which is preferably of rectangular shape and square in horizontal cross-section, the height being about the length of a cigar, so that the cigars may be maintained in the box in an upright or vertical position and preferably with their cut ends resting on the bottom. The advantages of this construction and arrangement will be more fully explained hereinafter.

The side walls 2 of the box are preferably formed of two thicknesses or layers, the outer layer of which terminates short of the inner layer at the upper ends to provide an exterior recess 3 around the projecting end 3ª of the inner layer, which serves as a guide and rest for the sides 4 of the cover 5, the cover being adapted to be entirely removed and not hinged, so that easy access may be had to the cigars, and by the upward extensions 3ª above the inner layer of the side wall a tight joint is provided and the entrance of air and escape of aroma from the cigars are prevented. The inner layer at the bottom terminates short of the lower ends of the outer layer. Against the lower edges of this inner layer is fitted a perforated bottom 6, upon which the ends of the cigars, which are designated by A, rest. The double-walled box not only provides strength, but also establishes practically an air and moisture proof receptacle, and the outer layer at its lower end being extended beyond the end of the inner layer and beyond the perforated bottom provides an open chamber 7 beneath said bottom. In this chamber may be fitted a removable moistener-holder 8. (Shown in Fig. 2.) The construction of this moistener-receptacle is such as to prevent the ingress and egress of air and moisture around the joints thereof, and for that purpose it is preferably provided with a bottom or cover 9, which fits up against the lower edges of the outer layers of the sides, and on the inner side of this cover is arranged a flange 10, the size of which is such as to tightly fit the chamber 7, with its outer edges in engagement with the under side of the perforated bottom. This flange is set inwardly from the edge of the cover 9, so as to provide a recess therearound in which the lower projecting ends of the outer layer of the sides are received. In this manner not only is a tight joint established between these lower projecting ends and the moistener-receptacle, but the flange of the latter engaging as it does the under side of the perforated bottom relieves the said bottom of pressure and reduces the liability of its displacement. When this moistener-receptacle has been fitted in the chamber 7, as shown in Fig. 1, the chamber is completely closed. In this moistener-receptacle is removably mounted a pad 11, which may be a piece of blotting-paper, a sponge, a thick layer of felt, or any other suitable material, all of the above having been tried and found practicable. The pad, however, is by the flange 10 prevented from contacting with the perforated bottom, so that there is an air-space between the upper surface of the pad and the under side of the bottom, and thus the perforated bottom is prevented from becoming dampened by direct contact with the pad, and, as has heretofore been experienced in moisteners of this character, the cigars are prevented by capillary attraction from being dampened or moistened to that extent which will render them unfit for use, while at the same time the moisture-pad will have the desired effect to throw off enough humidity to escape through the apertures in the perforated bottom and maintain the moisture in the cigars. It will be noted that by arranging the parts in this manner with the moistener at the bottom of the box and the cut ends of the cigars resting upon the perforated bottom the moisture thrown off from the pad through the apertures will have a tendency to penetrate within the filler of the cigar without affecting the wrapper or binder thereof, and thus the cigars are more susceptible to the vapor ascending from the moistener-receptacle, which may be readily removed without destroying the utility of the box as a receptacle for cigars and without permitting the atmosphere to enter the box, inasmuch as the projecting ends of the outer side walls may lie in contact with the article on which the box is supported.

Having thus described our invention, what we claim, and desire to secure by Letters Patent, is—

A cigar-box having its vertical side walls formed of two layers of material with the upper and lower ends thereof projecting beyond each other at the top and bottom thereof to provide recesses, a removable cover for the box having its vertical sides adapted to engage the recess at the upper end of the side walls, a removable moistener-receptacle provided with vertical flanges adapted to engage the recess at the bottom of the side walls, a pad located within the receptacle, and a perforated bottom fitted in the recess at the lower end of the side walls and adapted to be embraced on its lower side by the flanges of the moistener-receptacle, substantially as specified.

In testimony whereof we affix our signatures in presence of two witnesses.

WM. TISCH.
HENRY T. WATERS.

Witnesses:
CHAS. B. MILLER,
ROSA JAHN.